United States Patent

Ryu et al.

[11] Patent Number: 5,859,480
[45] Date of Patent: Jan. 12, 1999

[54] AC POWER SUPPLY CONTROLLER FOR USE IN SEMICONDUCTOR FABRICATION FACILITIES

[75] Inventors: Kyu-Bok Ryu; Jung-Ho Guk, both of Kyunggi-province, Rep. of Korea

[73] Assignee: Samsung Electronics Co., Ltd., Suwon, Rep. of Korea

[21] Appl. No.: 855,239

[22] Filed: May 13, 1997

[30] Foreign Application Priority Data

May 13, 1996 [KR] Rep. of Korea ................... 1996-15847

[51] Int. Cl.[6] .................................................. H02J 7/00
[52] U.S. Cl. .............................. 307/64; 307/18; 307/23; 307/31; 307/85; 364/492
[58] Field of Search .................................. 307/43, 44, 64, 307/65, 66, 85, 86, 87, 11, 18, 23, 24, 29, 31, 38, 80; 364/480, 492

[56] References Cited

U.S. PATENT DOCUMENTS

| 4,277,692 | 7/1981 | Small | 307/66 |
| 5,289,046 | 2/1994 | Gregorich et al. | 307/66 |
| 5,616,968 | 4/1997 | Fujii et al. | 307/66 |
| 5,619,077 | 4/1997 | Green et al. | 307/64 |
| 5,642,002 | 6/1997 | Mekanik et al. | 307/64 |

*Primary Examiner*—Jeffrey Gaffin
*Assistant Examiner*—Jonathan S Kaplan
*Attorney, Agent, or Firm*—Jones & Volentine, L.L.P.

[57] ABSTRACT

A power supply controller is capable of regulating the amount of electrical power supplied to semiconductor fabrication facilities to amounts in accordance with processing conditions of each facility. The apparatus includes a plurality of process status detectors corresponding to the facilities, each status detector detecting an operation mode of each of the facilities and generating a mode detection signal. A plurality of unit controllers are provided, corresponding to the process status detectors, each unit controller generating a power control signal in response to the mode detection signal. A plurality of power supply units are provided, corresponding to the unit controllers, each power supply unit controlling and providing an amount of electrical power from the main power supply to the facilities in response to the power control signal corresponding the operation mode of each facility.

12 Claims, 12 Drawing Sheets

AC POWER SUPPLY CONTROLLER FOR USE IN SEMICONDUCTOR FABRICATION FACILITIES

BACKGROUND OF THE INVENTION

1. Field of the Invention

The present invention relates to a power supply controller for use with semiconductor fabrication facilities, and more particularly, to a power supply controller capable of controlling the amount of AC power supplied to a semiconductor fabrication facilities in accordance with processing conditions therein.

2. Description of the Related Art

Semiconductor fabrication facilities have several types of diffusion furnaces that may be powered by a back-up power supply, in the event there is a power interruption in the commercial power lines delivering electrical power to the facilities. The back-up power from the back-up power supply is of relatively low capacity compared to the electrical power from the commercial power lines.

FIG. 1 is a block diagram of a conventional AC power supply controller for use in a semiconductor fabrication facility. As shown in FIG. 1, a main power supply 80 is connected to commercial electrical power line 100 for delivering AC electrical power to the facilities. A back-up power supply 110 delivers back-up power to the semiconductor fabrication facility in the event of electrical power failures. Power interruption detector 90 detects the power interruption in the commercial power line 100 and generates a power interruption signal. The back-up power supply 110 delivers the back-up power through the main power supply 80 to the facilities in response to the power interruption signal.

Electrical power from the main power supply 80 is delivered through power supply units 20, 40 and 60 to semiconductor fabrication facilities 30, 50 and 70 by means of a main controller 10, respectively. The main controller 10 detects whether the respective facilities require power and generates power control signals in response thereto. The first, second, . . . , and N-th power supply units 20, 40 and 60, which are electrically connected with first, second, . . . , and N-th facilities 30, 50 and 70, are selectively switched on in response to the power control signals from the main controller.

In the conventional power supply controller having the above described construction, the maximum amount of electrical power from the main power supply 80 continues to be delivered to the facilities requiring electrical power, regardless of processing conditions of the facility, that is, the power consumption conditions of each facility.

For example, as shown in FIG. 2A, if the first facility 30 is in a stand-by mode, the second facility 50 in a ramp-up mode, and the N-th facility 70 in a process mode, all of the respective facilities require electrical power. Accordingly, maximum electrical power (i.e., 100% power) from the main power supply 80 is supplied to the respective facilities, as shown in FIG. 2B, by the power supply units 20, 40 and 60.

If the facilities are in an off mode or a ramp-down mode, they do not require electrical power. For example, when a impurity diffusion apparatus is used at a facility, a diffusion tube thereof is heated during the ramp-up mode using maximum electrical power to attain a high internal temperature. Ramp-down mode refers to the situation where the diffusion tube is powered-off so as to have a low internal temperature.

During the stand-by mode or the process mode, each facility requires about 50% of the electrical power, as compared with the maximum electrical power consumption required during the ramp-up mode. However, it can be seen from FIGS. 1 and 2B that the conventional power supply controller of FIG. 1 delivers maximum electrical power to each facility, regardless of the power requirements dictated by the processing conditions in the respective facilities. Accordingly, when the conventional power supply controller is provided for three facilities, the maximum electrical power consumption required for the three facilities is equal to or less than about 300%.

In the event the main power supply is interrupted, if the back-up electrical power is simultaneously supplied to all of the facilities, an electrical power failure may result due to the limited power capacity of the back-up power supply 110. Such a occur. Such a power failure affects the electrical characteristics of the semiconductor device being produced.

SUMMARY OF THE INVENTION

An object of the present invention is to provide a power supply controller which is capable of regulating the amount of AC electrical power supplied to semiconductor fabrication facilities to amounts based on the actual power consumption requirements of the facilities, even when the source of the electrical power is a back-up power supply.

To achieve this object, the present invention provides a power supply controller for use with a plurality of semiconductor fabrication facilities configured as follows. A commercial power line and a back-up power supply are provided to deliver electrical power to the facilities. A power interruption detector detects whether there is a power interruption in the commercial power line and generates an interruption detection signal indicative of whether a power interruption is detected. The back-up power supply delivers back-up electrical power when the interruption detection signal indicates a power interruption in the commercial power line. A main controller generates a power selection signal in response to the interruption detection signal. The main controller also generates an operation starting signal. A main power supply is connected to the main controller and receives the power selection signal therefrom. The main power supply selectively supplies the commercial electrical power or the back-up electrical power to the facilities in response to the power selection signal. Process status detectors are associated with the facilities, respectively. Each process status detector detects an operation mode of the facility associated therewith, and generates a mode detection signal in response to the operation mode. Unit controllers, operatively connected to the main controllers and to the process status detectors, are activated by the operation starting signal, and generate power control signals, respectively, in response to the mode detection signals. Power supply units, operatively connected to the facilities, are activated in response to the power control signals of the unit controller to control the amount of electrical power supplied to the facilities.

The main controller has a microcomputer, a key entry portion, a memory portion, and a counter. The microcomputer generates the power selection signal and the operation starting signal. The key entry portion is for inputting operation starting information of an initial unit controller and a last unit controller which are operated. The memory portion stores the operation starting information. The counter counts the operation starting information of the unit controllers loaded thereto every time a process of a specific facility is terminated.

Each of the unit controllers comprises a microcomputer activated by the operation starting signal, to receive the mode detection signal and generate first, second or third power control signals. The particular power control signal generated is issued to the associated power supply unit in response to the mode detection signal.

Each of the plurality of power supply units also comprises a microcomputer.

The microcomputer of a power supply unit receives the power control signal from the associated unit controller and uses the signal to designate the amount of electrical power that should be supplied from the main power supply to the facilities. A plurality of power output drivers are connected to the microcomputer for providing the designated amount of electrical power to the facilities.

Accordingly, the amount of electrical power provided to each facility will correspond to the operation mode of the facility, i.e., to the power consumption required by the facility.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF PREFERRED EMBODIMENTS

Figure 1:
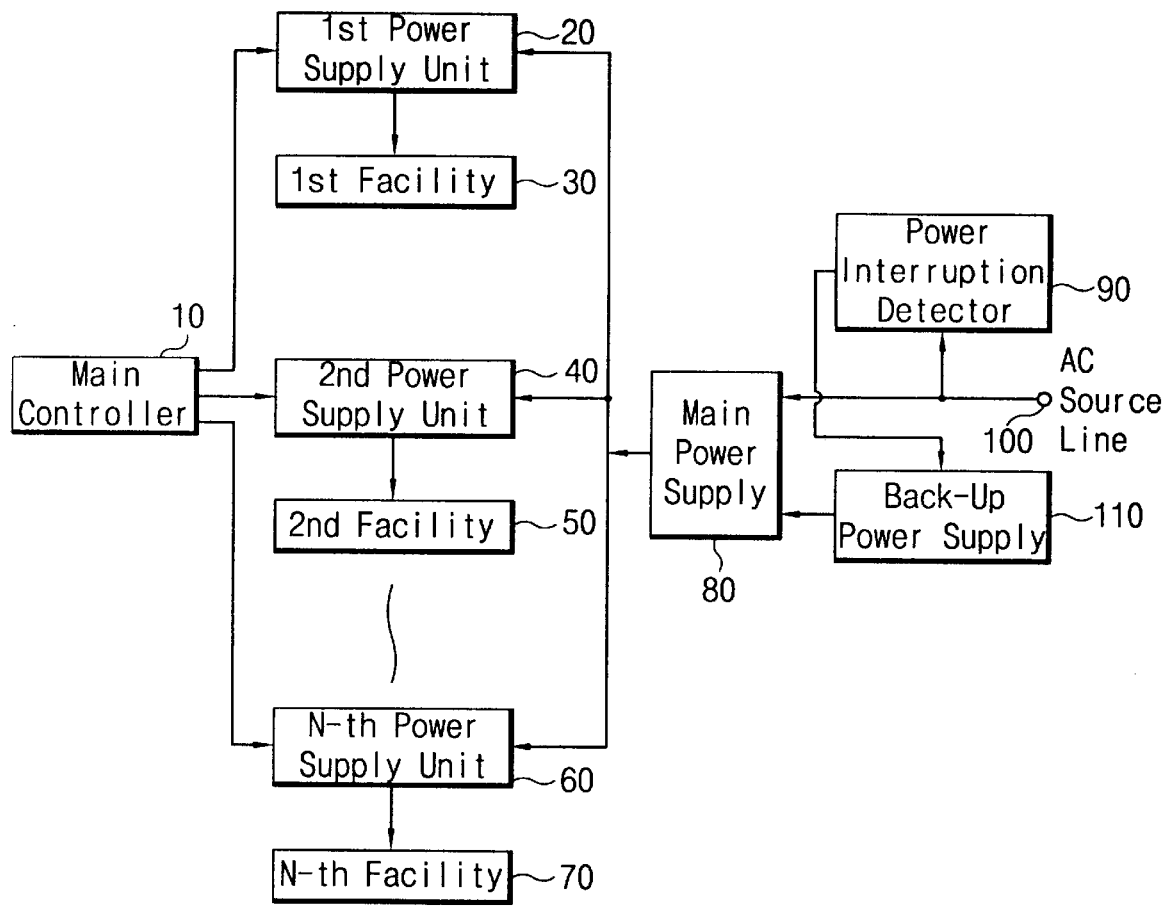
FIG. 1 is a block diagram showing a conventional power supply controller specifically adapted for use with semiconductor fabrication facilities.
Figure 2A:
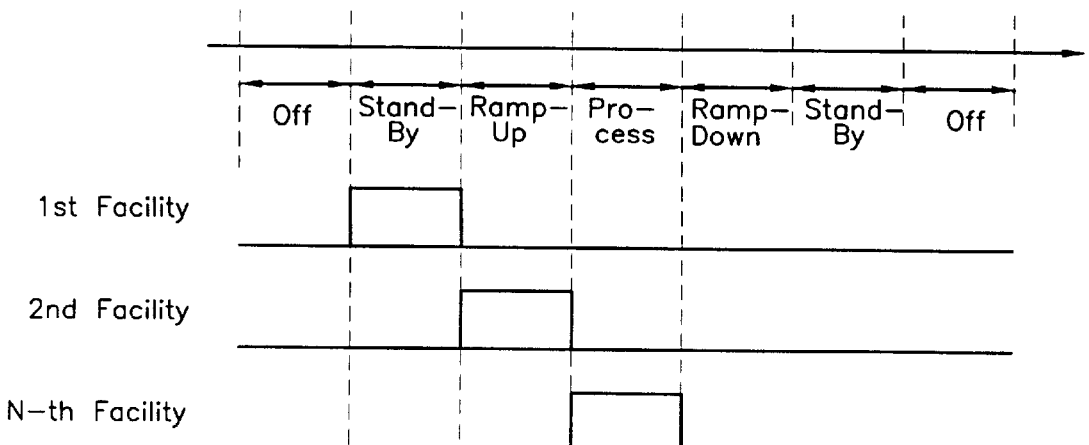
FIGS. 2A and 2B are graphs explaining the total amount of power consumption which is required for several semiconductor fabrication facilities using the conventional power supply controller shown in FIG. 1.
Figure 2B:
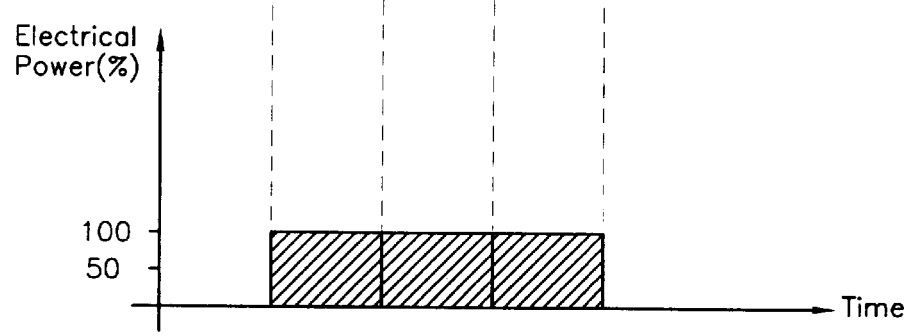
Figure 3:
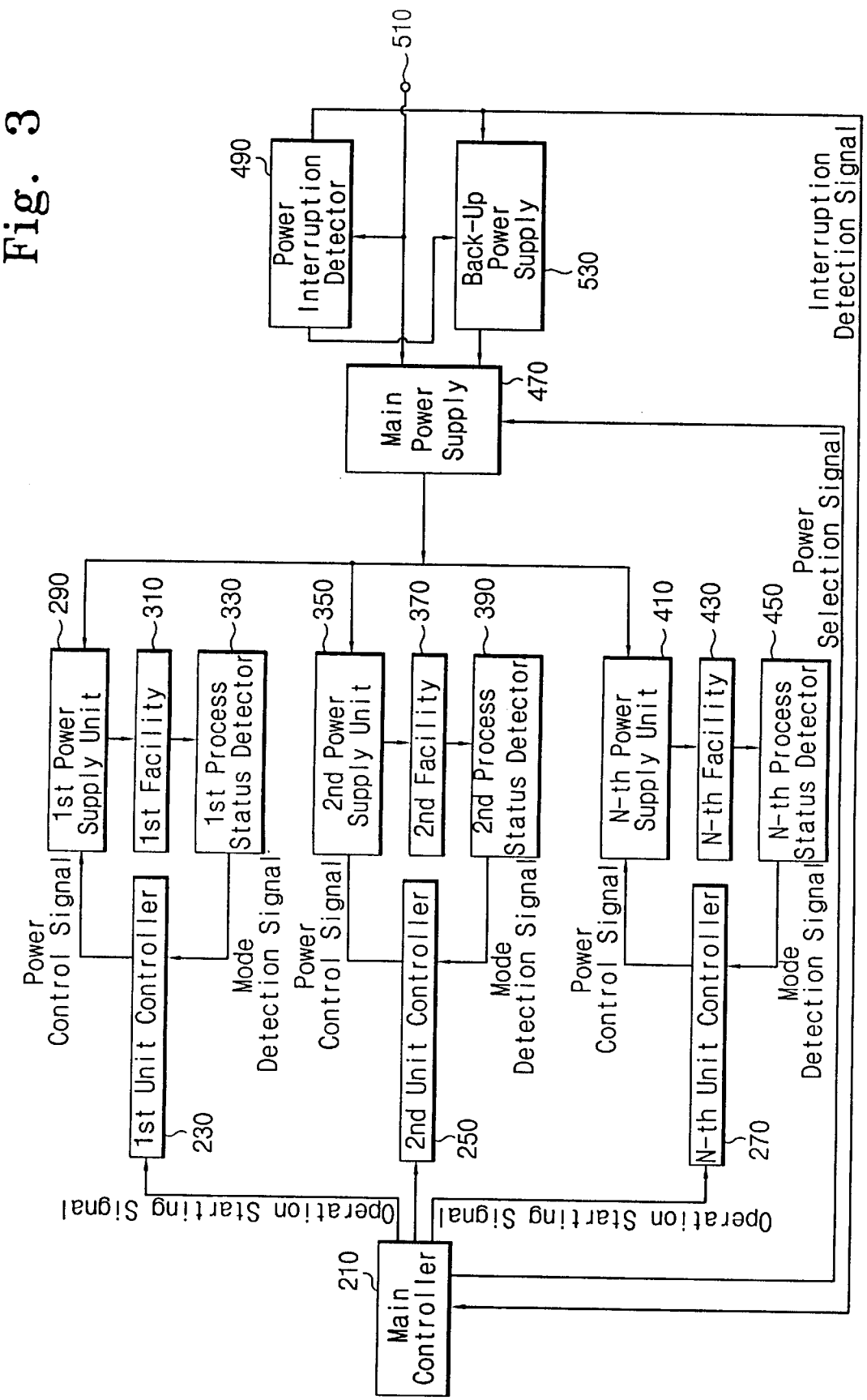
FIG. 3 is a block diagram showing a power supply controller for use with semiconductor fabrication facilities according to an embodiment of the present invention.

FIG. 3 is a block diagram showing an embodiment of a novel power supply controller according to the present invention. FIG. 3 illustrates an AC power supply controller which is adapted for use with first, second and N-th semiconductor fabrication facilities 310, 370, 430, respectively.

Referring to FIG. 3, a main AC power supply 470 is electrically connected to commercial power line 510 for delivering commercial electrical power to the facilities. A back-up power supply 530 generates back-up electrical power in the event of electrical power interruption, and supplies either the commercial electrical power or the back-up electrical power to the facilities 310, 370, 430. A power interruption detector 490 detects the power interruption in the commercial power line 510 and generates an interruption detection signal. The back-up power supply 530 receives the interruption detection signal from the detector 490 to generate the back-up electrical power.

A main controller 210 also receives the interruption detection signal and generates a power selection signal. Then, the main power supply 470 selectively supplies either the commercial electrical power or the back-up electrical power to the facilities.

The main controller 210 also generates an operation starting signal in response to a key entry. The operation starting signal is provided to any one of the first, second, or N-th unit controllers 230, 250, 270 so that the corresponding unit controller may commence operation.

For example, after the first unit controller 230 receives the operation starting signal, it can then receive a mode detection signal from a first process status detector 330. The first process status detector 330 detects the operation mode of the first facility 310, for example, an operation-off mode, a stand-by mode, a ramp-up mode, a process mode or a ramp-down mode. The first unit controller 230 then generates a power control signal that is fed to the first power supply unit 290.

As before, the ramp-up mode means, for example, that a diffusion tube of an impurity diffusion apparatus is heated using maximum electrical power to attain a high internal temperature. Ramp-down mode refers to the situation where the diffusion tube is powered-off so as to have a low internal temperature.

Figure 11:
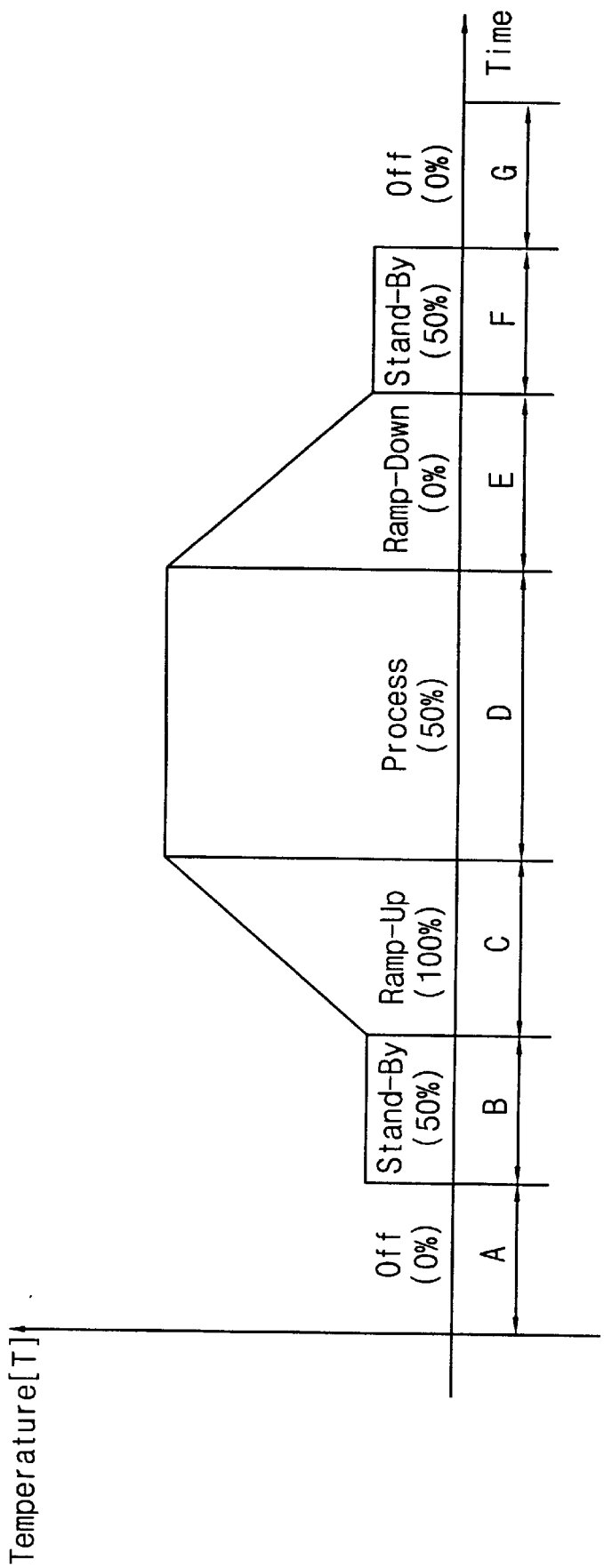
FIG. 11 is a graph explaining the power consumption required for a specific facility in accordance with the operation modes above.

As shown in FIG. 11, if a facility is in the ramp-up mode 'C', the facility requires maximum (100%) electrical power. If the facility is in the stand-by mode, 'B' or 'F', or the process mode 'D', it requires 50% of the electrical power as compared to the maximum electrical power. Also, if the facility is in the ramp-down mode 'E' or the operation-off mode, 'A' or 'G', it requires no electrical power.

Referring again to FIG. 3, the first power supply unit 290 is switched on by the power control signal from the first unit controller 230. The first power supply unit 290 operates to control the amount of electrical power from the main power supply 470 to the first facility 310. Accordingly, the amount of electrical power corresponding to the detected operation mode of the first facility 310 is supplied to the first facility 310. If, for example, the first facility 310 is in a ramp-up mode, the maximum electrical power can be supplied to the first facility 310. If, however, the first facility 310 is in a stand-by mode or a process mode, 50% of the electrical power compared to the maximum electrical power can be supplied to the first facility 310.

Figure 4:
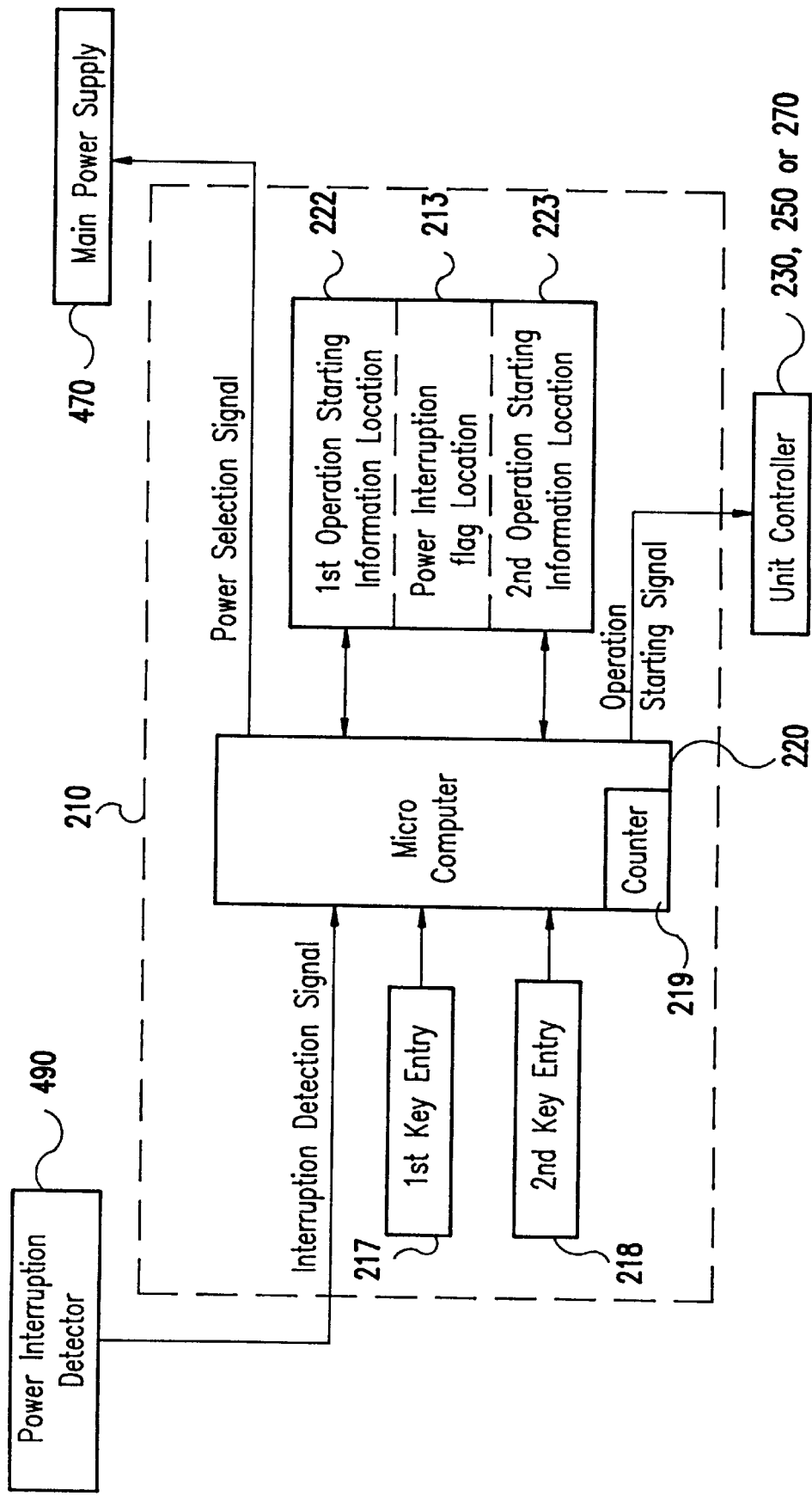
FIG. 4 is a detailed block diagram showing the main controller of the power supply controller shown in FIG. 3.
Figure 7:
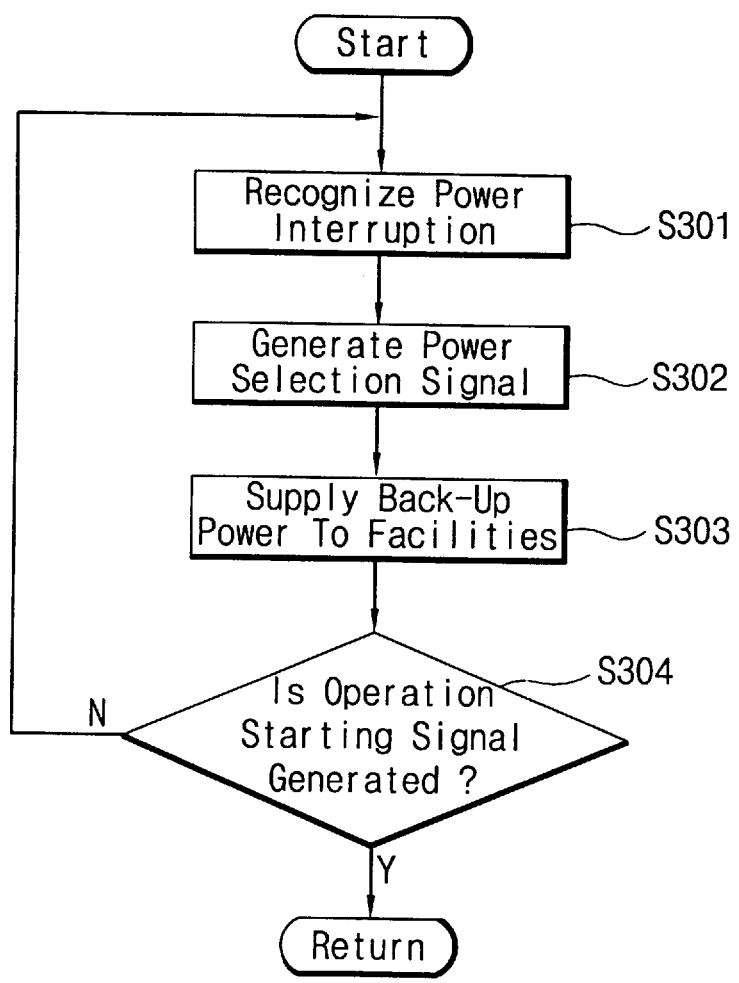
FIG. 7 is a flow chart illustrating an example of the operation of the main controller shown in FIG. 4.

FIG. 4 is a block diagram of a detailed circuit of the main controller 210 shown in FIG. 3. The operation of the main controller 210 will now be described with reference to a FIG. 4 and the flow chart shown in FIG. 7. The control program shown in the flow chart of FIG. 7 is performed in the main controller 210.

When the main controller 210 receives an interruption detection signal from the power interruption detector 490, a microcomputer 220 of the main controller 210 recognizes that there is power interruption in the commercial power line 510 (step S301), and generates a power selection signal (step S302). This power selection signal is fed to the main power supply 470 so that back-up electrical power from the back-up power supply 530 can be supplied to the facilities (step S303). At step S304, the microcomputer 220 determines which of the unit controllers 230, 250 and 270 must be operated. If an operation starting signal is generated from the microcomputer 220, the corresponding unit controller, for example, the first unit controller 230, commences operation in response to the operation starting signal. The first unit controller 230 thus allows the first process status detector 330 to detect the operation mode of the first facility 310. After detecting the operation mode of the first facility 310, the first process status detector 330 generates a mode detection signal indicative of the operation mode thereof.

The first unit controller 230 performs the control program shown in the flow chart of FIG. 8, described in detail later, and generates a power control signal that is supplied to the power supply unit 290 for controlling the amount of the back-up power. The first unit controller 230 thus allows the first power supply unit 290 to deliver the required amount of the back-up power to the first facility 310 in response to the power control signal.

As shown in FIG. 4, in addition to the microcomputer 220, the main controller 210 comprises key entry portion 217, 218, a counter 219 incorporated in the microcomputer 220, and a memory portion 222, 223. The key entry portion is comprised of two key entries 217 and 218. One is provided to input the number (i.e., operation starting information) of an initial unit controller to be operated, for example, a first unit controller 230, and the other is provided to input the number (i.e., operation starting information) of the last unit controller to be operated, for example, an N-th unit controller 270.

The operation starting information of the initial and last unit controllers are stored in the memory portion, which is composed of two information storing locations 222 and 223 for storing the operation starting information. One of the information storing locations 222 stores the operation starting information of the initial unit controller in accordance with the key entry 217, and the other 223 stores the operation starting information of the last unit controller in accordance with the key entry 218.

The operation starting information of the unit controllers is loaded to the counter 219 incorporated in the microcomputer 220 and is counted down or up every time the process of a specific facility is terminated. The microcomputer 220 compares the counted contents of the counter 219 with the number of the last unit controller being operated. The counting operation of the counter 219 continues until the counted contents of the counter 219 equals the number of the last unit controller being operated. The memory portion further comprises a location 213 for storing a flag indicative of a power interruption.

Referring again to FIG. 4, if the microcomputer 220 does not recognize a power interruption in the commercial power line 510 at step S301, the commercial electrical power is supplied to the facilities in place of the back-up electrical power.

Figure 8:
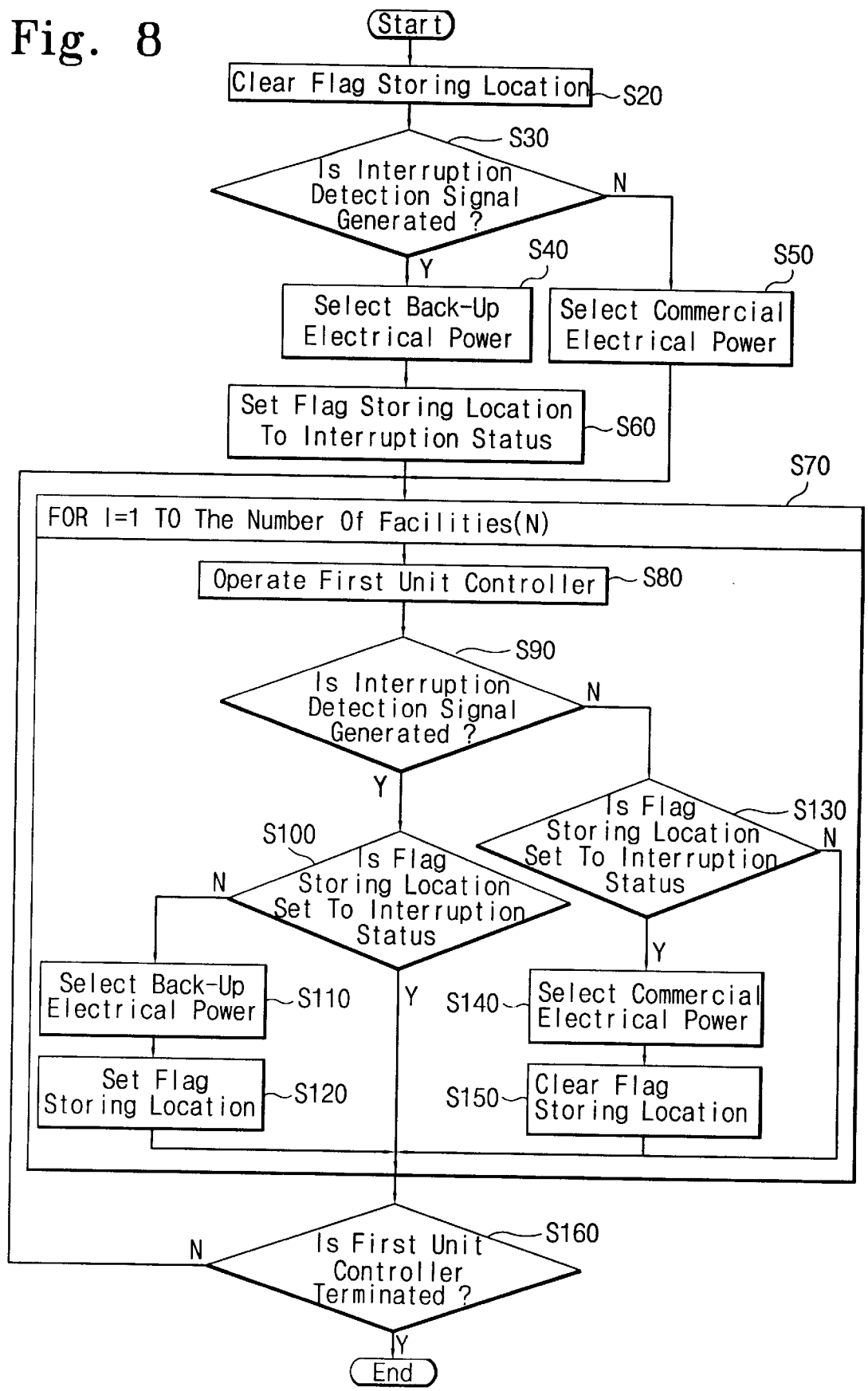
FIG. 8 is a flow chart illustrating a more detailed operation of the main controller show in FIG. 4.

FIG. 8 illustrates a more detailed operation of the main controller shown in FIG. 4. First, at step S20, the main controller 210 allows the flag storing location 213 to be cleared, meaning commercial electrical power 510 is supplied to the main power supply 470 (shown in FIG. 3).

In step S30 the main controller 210 checks whether an interruption detection signal is generated from the power interruption detector 490. If the interruption detection signal is generated, control proceeds to step S40, wherein the main controller 210 provides a power selection signal to the main power supply 470 so as to select the back-up electrical power from the back-up power supply 530. After the selection of the back-up electrical power, control proceeds to step S60, wherein the main controller 210 allows the flag storing location 213 to be set to an interruption status. If the interruption detection signal is not generated at step S30, control proceeds to step S50, wherein the main controller selects commercial electrical power that is provided to the main power supply 470.

After the flag storing location 213 is set to interruption status in step S60, or when the commercial electrical power is selected in step S50, control proceeds to step S70 wherein the main controller 210 allows the operation starting information of an initial facility and the last facility to be stored in the information storing locations 222 and 223 in accordance with key entries 217 and 218.

The remaining steps in FIG. 8 will be described assuming that the first facility 310 commences operation, it being understood that the flow diagram is equally applicable to the other facilities 370 and 430.

Control proceeds to step S80, wherein the main controller 210 generates an operation starting signal to allow the first unit controller 230 to be operated. At step S90, the main controller 210 checks whether an interruption detection signal is generated from the power interruption detector 490. If so, control proceeds to step S100, wherein the main controller 210 checks whether the flag storing location 213 is set to interruption status. At step S100, if the flag storing location 213 is not set, control proceeds to step S10, wherein the main controller 210 selects the back-up electrical power and provides it to the main power supply 470. In step S120 the main controller 210 allows the flag storing location 213 to be set to interruption status.

At step S90, if the interruption detection signal is not generated, control proceeds to step S130 where the main controller 210 checks whether the flag storing location 213 is set to interruption status.

At step S130, if the flag storing location 213 is set, control proceeds to step S140 wherein the main controller 210 selects the commercial electrical power. In step S150, the main controller allows the flag storing location 213 to be cleared.

At step S130, if the flag storing location 213 is not set, control proceeds to step S160, where the main controller 210 determines whether the operation of the first unit controller 230 is terminated. If the operation of the first unit controller 230 is not terminated, control returns to step S70. If the operation of the first unit controller 230 is terminated, the execution of the control program is completely terminated.

Figure 5:
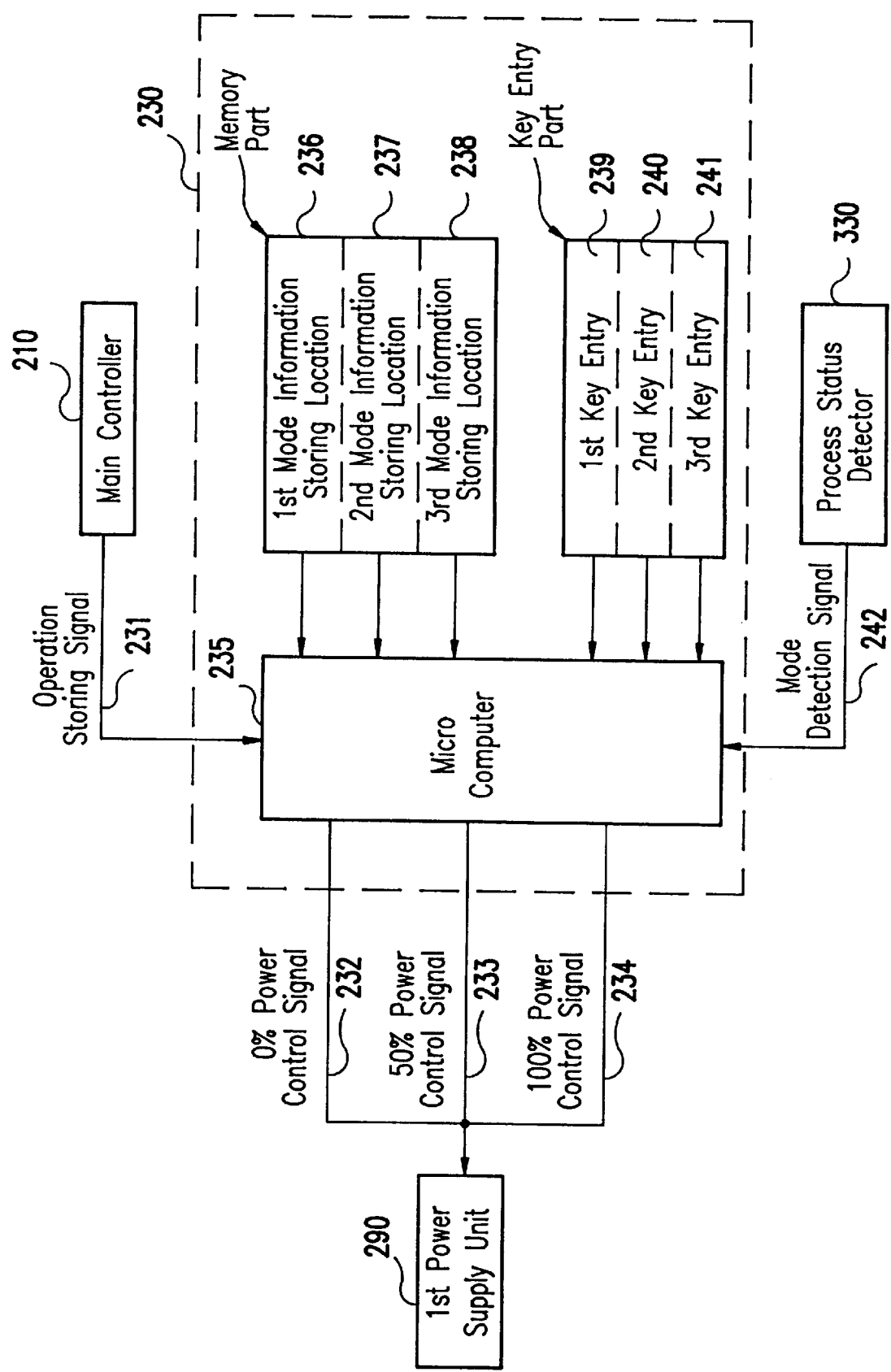
FIG. 5 is a detailed block diagram showing the first unit controller of the power supply controller shown in FIG. 3.

FIG. 5 illustrates a detailed circuit diagram of the first unit controller 230 shown in FIG. 3. It is understood that the second unit controller 250 or the N-th unit controller 270 have the same construction as the first unit controller 230, and accordingly, the description thereof is omitted for brevity.

Referring to FIG. 5, the first unit controller 230 has a microcomputer 235 which receives the mode detection signal (on a signal line 242) from the process status detector 330 in accordance with the operation starting signal (on a signal line 231) from the main controller 210. The microcomputer 235 provides first, second or third power control signals to the first power supply unit 290 in response to the mode detection signal. Herein, the first power control signal on signal line 232 indicates (0) zero % electrical power signal to be supplied from the first power supply unit 290 to the first facility 310. The second power control signal on a signal line 233 indicates a 50% electrical power signal be supplied from the first power supply unit to the first facility, and the third power control signal on a signal line 234 indicates a 100% electrical power signal to be supplied from the first power supply unit to the first facility.

In addition to the microcomputer 235, the first unit controller 230 further comprises a memory part composed of a plurality (e.g., first, second and third) of information storing locations 236, 237 and 238, and a key entry part composed of a plurality (e.g., first, second and third) of information key entries 239, 240 and 241.

In the memory part of the first unit controller 230 shown in FIG. 5, the first information storing location 236 stores information of a first 0% operational electrical power mode including, as shown in FIG. 11 for example, a first operation-off mode 'A', a ramp-down mode 'E', and a second operation-off mode 'G' in accordance with the first key entry 239.

The second information storing location 237 stores information of a second 50% operation mode including a first stand-by mode 'B', a process mode 'D', and a second stand-by mode 'F' in accordance with the second key entry 240. The third information storing location 238 stores information of a third 100% operational mode including a the ramp-up mode 'C' in accordance with the third key entry 241.

Figure 9:
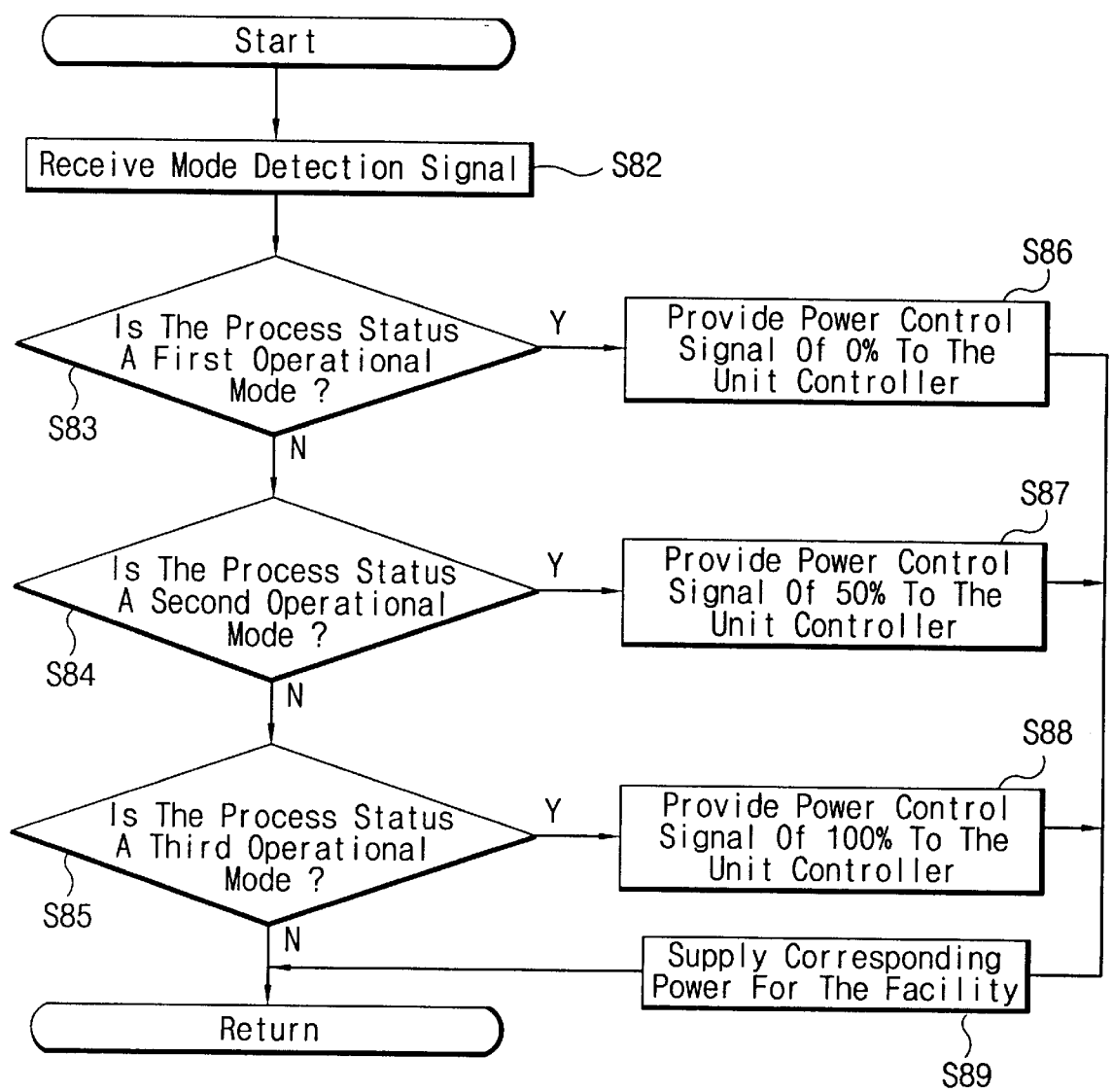
FIG. 9 is a flow chart illustrating the operation of the first unit controller shown in FIG. 5.

As described immediately above, the microcomputer 235 allows the mode information to be stored in the memory part thereof in accordance with the key entry part. The operation of the first unit controller 230 will be described with reference to FIG. 9.

At step S82, the first unit controller 230 receives the mode detection signal from the first process status detector 330, and control proceeds to step S83 wherein the first unit controller 230 checks whether the process status of the first facility 310 is at the first operational mode. If so, control proceeds to step S86, wherein a first power control signal is generated and provided to the first power supply unit 290 so as to generate electrical power of zero percent for the first facility 310 at step S89.

At step S83, if the process status of the first facility 310 is not at the first operational mode, control proceeds to step S84, wherein the first unit controller 230 checks whether the process status of the first facility 310 is at the second operational mode. If so, control proceeds to step S87, wherein a second power control signal is generated and provided to the first power supply unit 290 so as to generate about 50% electrical power for the first facility 310 at step S89.

At step S84, if the process status of the first facility 310 is not at the second operational mode, control proceeds to step S85, wherein the first unit controller 230 checks whether the process status of the first facility 310 is at the third operational mode. If so, the control proceeds to step S88, wherein a third power control signal is generated and provided to the first power supply unit 290 so as to generate about 100% electrical power for the first facility 310 at step S89.

At step S85, if the process status of the first facility 310 is not at the third operational mode, or after step S89 is terminated, control is returned.

Figure 6:
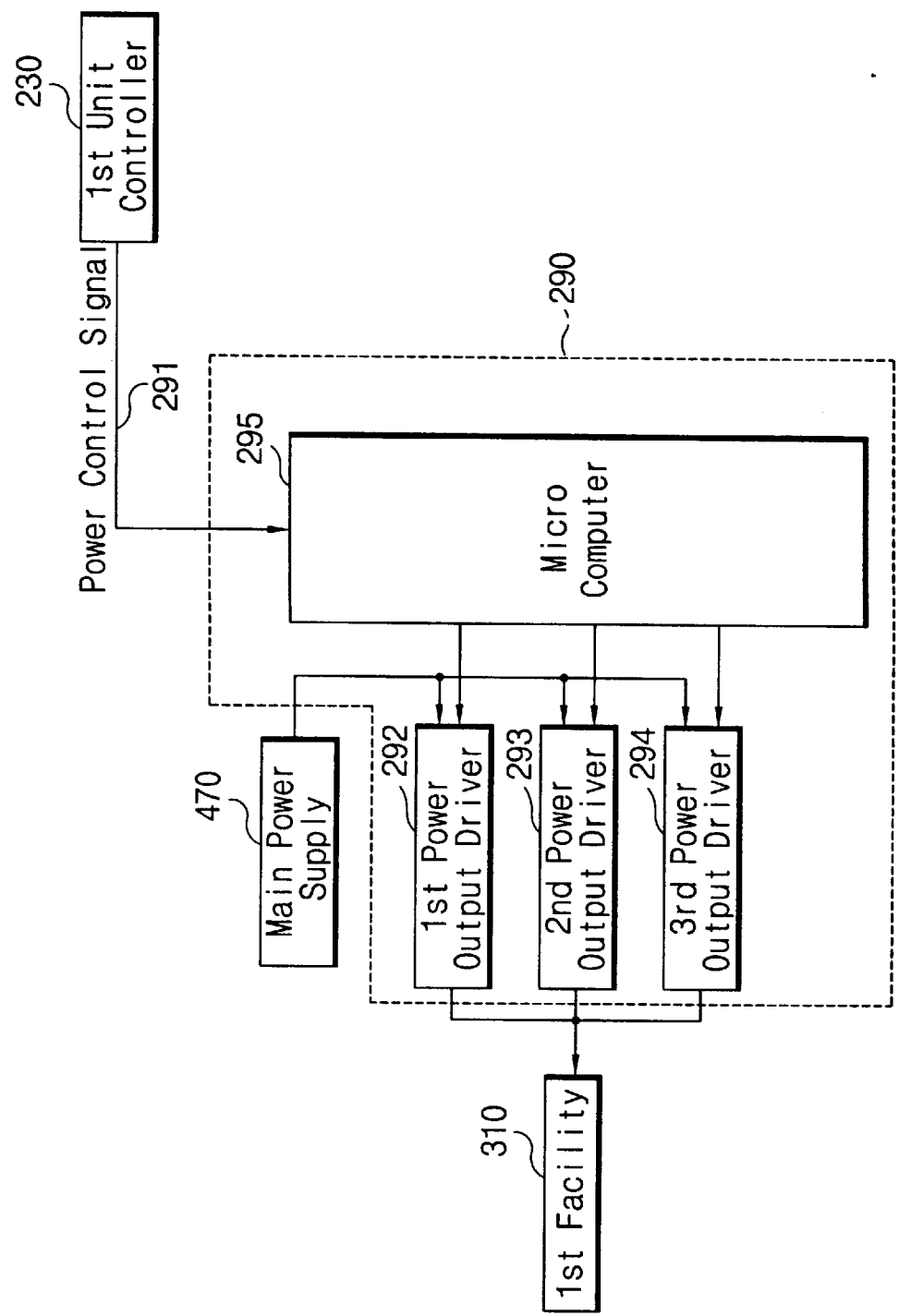
FIG. 6 is a detailed block diagram showing the first power supply unit of the power supply controller shown in FIG. 3.

FIG. 6 is a block diagram of a detailed circuit of the first power supply unit 290 shown in FIG. 3. It is understood that the second 350 or the third power supply unit 410 operates the same as that of the first power supply unit 290, and therefore the detailed description thereof is omitted for brevity.

Referring to FIG. 6, the first power supply unit 290 has a microcomputer 295 and at least three power output drivers 292, 293 and 294. The microcomputer 295 receives a power control signal on signal line 291 from the first unit controller 230 and controls the power output drivers 292, 293 and 294 so as to control the amount of the electrical power from the main power supply 470 to the first facility 310. The first power supply output driver 292 provides an electrical power of zero percent (0%) to the first facility 310 in accordance with the control of the microcomputer 295. The second power supply output driver 293 provides an electrical power of about 50% to the first facility in accordance with the control of the microcomputer 295, and the third power supply output driver 294 provides an electrical power of about 100% to the first facility in accordance with the control of the microcomputer 295.

Figure 10:
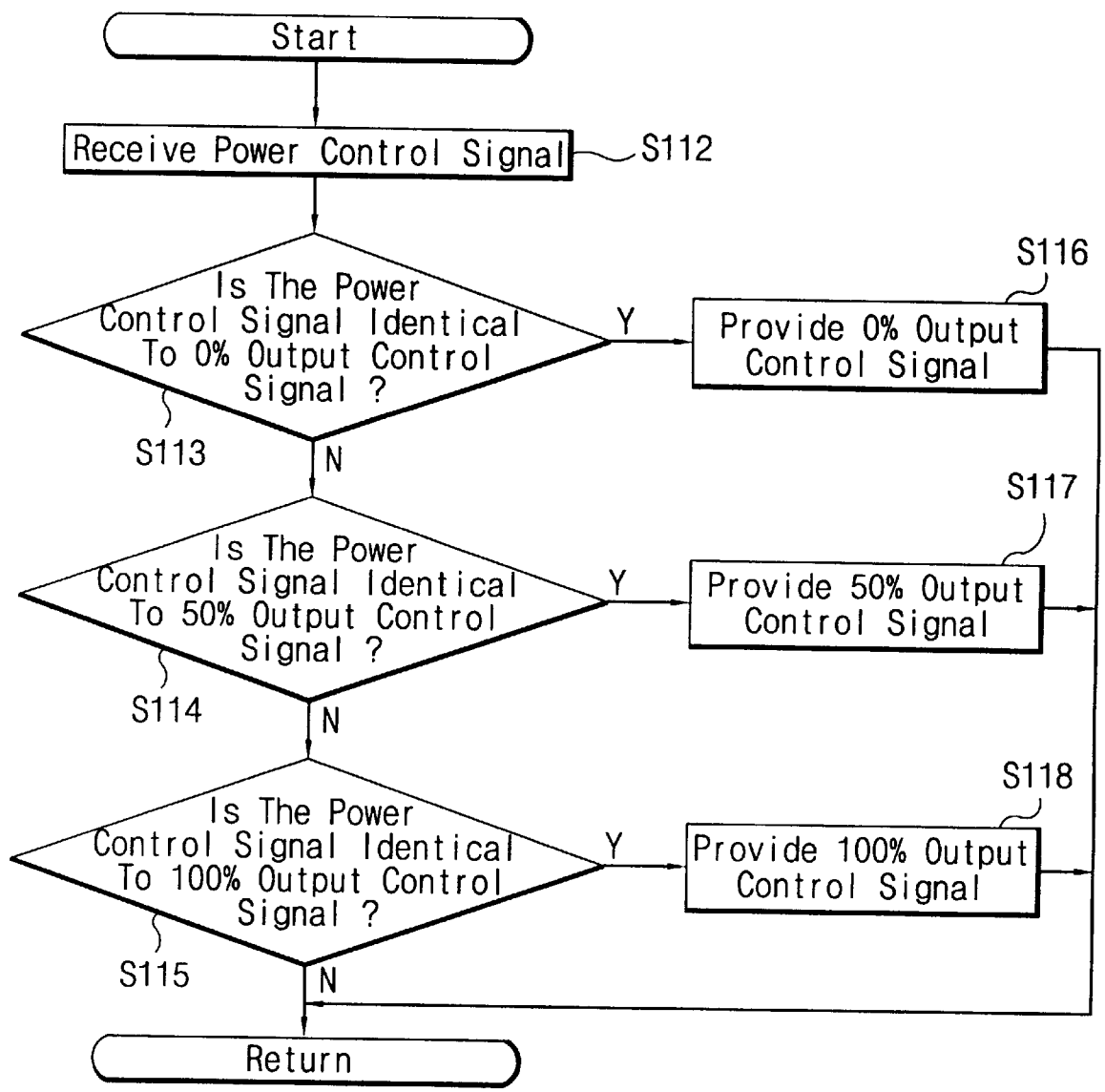
FIG. 10 is a flow chart illustrating the operation of the first power supply unit shown in FIG. 6.

Hereinafter the operation of the first power supply unit 290 will now be described with reference to a flow chart shown in FIG. 10. The control program shown in the flow chart of FIG. 10 is performed in the microcomputer 295.

At step S112, the microcomputer 295 receives a power control signal from the first unit controller 230, and control thereof proceeds to step S113 wherein the microcomputer 295 determines whether the voltage level of the power control signal is identical to an output control signal of zero % power. If so, control proceeds to step S116, wherein the first power supply unit 290 allows an electrical power of zero percent to be provided through the first power output driver 292 to the first facility 310.

At step S113, if the microcomputer 295 determines that the voltage level of the power control signal is not identical to an output control signal of zero % power, control proceeds to step S114, wherein the microcomputer 295 determines whether the voltage level of the power control signal is identical to an output control signal of 50% power. If so, the control proceeds to step S117, wherein the first power supply unit 290 allows an electrical power of 50% to be provided through the second power output driver 293 to the first facility 310.

At step S114, if the microcomputer 295 determines that the voltage level of the power control signal is not identical to an output control signal of 50% power, control proceeds to step S115, wherein the microcomputer 295 determines whether the voltage level of the power control signal is identical to an output control signal of 100% power. If so, the control proceeds to step S118, wherein the first power supply unit 290 allows an electrical power of 100% to be provided through the third power output driver 294 to the first facility 310.

Accordingly, the first power supply unit 290 allows an adequate amount of electrical power to be provided to the first facility 310 in accordance with the processing conditions, that is, power consumption conditions and requirements thereof. The power consumption conditions of each facility may be changed dependent on the operation modes thereof.

Figure 12A:
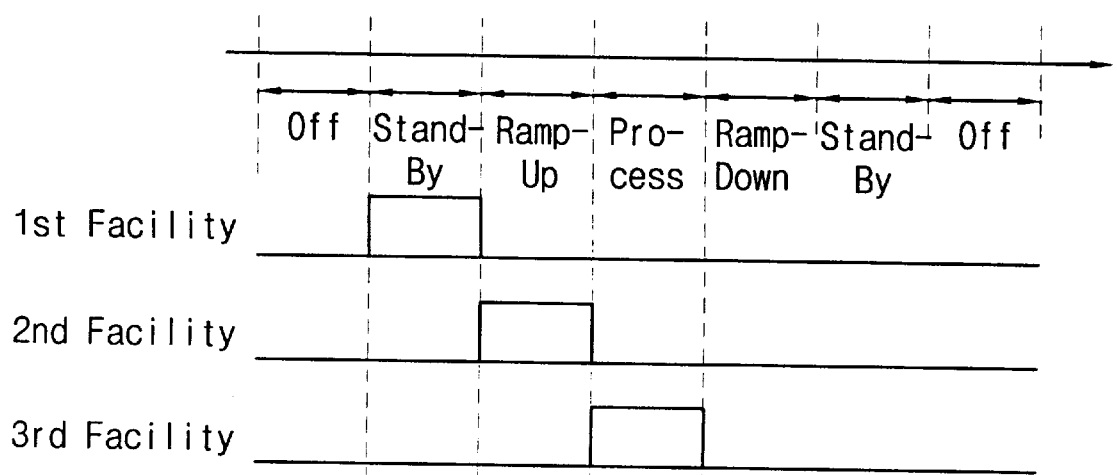
FIGS. 12A and 12B are graphs explaining the total amount of power consumption that is required for several semiconductor fabrication facilities using the power supply controller shown in FIG. 3.
Figure 12B:
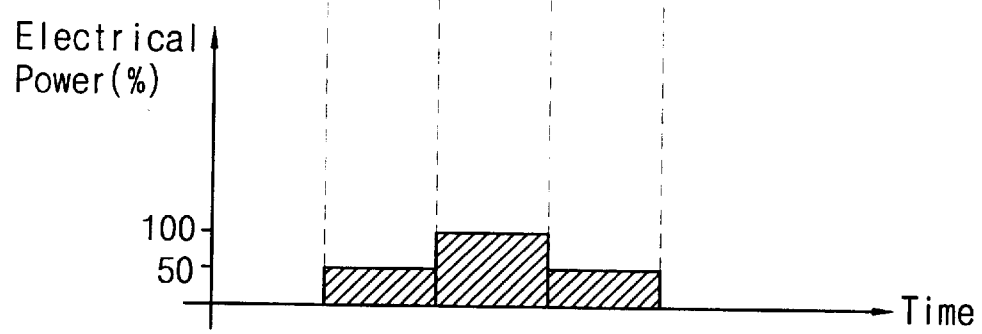

FIGS. 12A and 12B show the total amount of power consumption which is provided for several semiconductor fabrication facilities using the novel power supply controller of the present invention. It can be seen from FIGS. 12A and 12B that the electrical power of about 50% is provided to the first and the third facilities during a stand-by mode or a process mode thereof, and that the electrical power of about 100% is provided to the second facility only during a ramp-up mode thereof Accordingly, when the power supply controller of the present invention is provided for three facilities, the maximum electrical power consumption required for the three facilities is equal to or less than about 200%.

As described above, the power supply controller of the present invention allows the amount of electrical power provided to the facilities to be controlled in accordance with the operation modes, i.e., power consumption conditions of each facility. Therefore, even though back-up electrical power from a back-up power supply is simultaneously delivered to all of the facilities during power interruption, electrical power failure in the back-up power supply can be prevented.

While the invention has been described in terms of the embodiments described above, those skilled in the art will recognize that the invention can be practiced with modification within the spirit and scope of the appended claims and their equivalents.

What is claimed is:

1. A power supply controller for controlling the amount of power supplied to each of a plurality of fabrication facilities, each facility having different operation modes under which the facility is operated with different designated amounts of power, said power supply controller comprising:

a commercial power line through which commercial electric power is to be delivered to the facilities;

a power interruption detector detecting whether there is a power interruption in the commercial power line and generating an interruption detection signal indicative of whether the power interruption is detected;

a back-up power supply delivering back-up electrical power to the facilities when the interruption detection signal is indicative of a power interruption in the commercial line;

main controller means for generating a power selection signal in response to the interruption detection signal and for generating an operation starting signal;

a main power supply operatively connected to said commercial power line, to said back-up power supply, and to said main controller so as to selectively supply the commercial electrical power or the back-up electrical power to the facilities in response to the power selection signal;

a plurality of process status detector means operatively connected to the fabrication facilities, respectively, for detecting the operation modes of each of the facilities, and generating a mode detection signal indicative of the operation mode of the facility to which the detector means is operatively connected;

a plurality of unit controller means operatively connected to said main controller for being activated by the operation starting signal, each of said unit controllers also being operatively connected to a respective one of said process status detectors for selectively generating one of a plurality of different power control signals in response to the mode detection signal, and each of which power control signals corresponds to at least one respective operation mode of the corresponding facility; and a plurality of power supply means operatively connected to said unit, controller means respectively, and activated in response to the power control signal generated by the respective unit controller means connected thereto for regulating the amount of electrical power supplied from the main power supply to the corresponding facility to a designated amount based on the operation mode of the corresponding facility.

2. The power supply controller of claim 1, wherein said main controller means comprises a microcomputer for generating the power selection signal in response to the interruption detection signal and for generating the operation starting signal.

3. The power supply controller of claim 2, wherein said main controller further comprises:

a key entry portion for inputting operation starting information of an initial one of the unit controller means to be operated and a last one of the unit controller means to be operated;

a memory portion for storing the operation starting information; and a counter for counting the operation starting information of the unit controller means loaded thereto every time a process of a specific one of the facilities is terminated.

4. The power supply controller of claim 3, wherein said counter is incorporated in the microcomputer.

5. The power supply controller of claim 3, wherein said key entry portion includes first and second key entries, said first key entry provided to input the operation starting information of the initial unit controller means to be operated, and the second key entry provided to input the operation starting information of the last unit controller means to be operated.

6. The power supply controller means of claim 3, wherein said memory portion includes first and second storing locations, said first storing location storing the operation starting information of the initial unit controller to be operated and the second storing location storing the operation starting information of the last unit controller means to be operated.

7. The power supply controller of claim 3, wherein said microprocessor compares a counted content of the counter with the operation starting information of the last unit controller means.

8. The power supply controller of claim 6, said first memory portion further comprising a location for storing a flag indicative of power interruption.

9. The power supply controller of claim 1, wherein each of said plurality of unit controller means comprises a microcomputer activated by the operation starting signal, to receive the mode detection signal and generate first, second or third power control signals to be supplied to one of the plurality of power supply unit means in response to the mode detection signal.

10. The power supply controller of claim 9, further comprising a memory portion including a plurality of information storing locations, and a key entry portion including a plurality of information key entries, each connected to said microcomputer.

11. The power supply controller of claim 10, wherein each of said power supply unit means comprises a microprocessor for receiving the power control signal from the corresponding unit controller means so as to provide the designated amount of the electrical power to the corresponding facility.

12. The power supply controller of claim 11, wherein each of said power supply unit means further comprises a plurality of power output drivers connected to the microcomputer thereof for providing the designated amount of electrical power to the corresponding facility.

* * * * *